United States Patent
Satoh et al.

(10) Patent No.: US 6,523,966 B1
(45) Date of Patent: Feb. 25, 2003

(54) LCD DISPLAY WITH MULTI-COLOR ILLUMINATION MEANS

(75) Inventors: Noriyoshi Satoh, Kanagawa (JP); Makoto Tamaru, Kanagawa (JP); Masashi Fujita, Shizuoka (JP); Fumihiro Muramatsu, Shizuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/528,123

(22) Filed: Mar. 17, 2000

(30) Foreign Application Priority Data

Mar. 19, 1999 (JP) .............................. 11-075901

(51) Int. Cl.⁷ ................................................ F21V 8/00
(52) U.S. Cl. ........................... 362/31; 362/555; 362/27; 362/561; 349/64; 349/68
(58) Field of Search ..................... 362/800, 23, 26, 362/29, 30, 31, 551, 555, 559, 561, 27; 349/61, 62, 64, 68; 359/48; 257/88, 89, 90

(56) References Cited

U.S. PATENT DOCUMENTS

| | | | | |
|---|---|---|---|---|
| 3,712,047 A | * | 1/1973 | Girard | 368/242 |
| 4,257,084 A | * | 3/1981 | Reynolds | 362/31 |
| 5,008,788 A | * | 4/1991 | Palinkas | 362/231 |
| 5,324,962 A | * | 6/1994 | Komoto et al. | 257/89 |
| 5,375,043 A | * | 12/1994 | Tokunaga | 362/231 |
| 5,618,096 A | * | 4/1997 | Parker et al. | 362/235 |
| 5,876,107 A | * | 3/1999 | Parker et al. | 362/231 |
| 5,883,684 A | * | 3/1999 | Millikan et al. | 349/65 |
| 5,921,652 A | * | 7/1999 | Parker et al. | 362/31 |
| 5,940,153 A | * | 8/1999 | Castañeda et al. | 349/58 |
| 6,005,692 A | * | 12/1999 | Stahl | 359/15 |
| 6,147,367 A | * | 11/2000 | Yang et al. | 257/88 |
| 6,222,597 B1 | * | 4/2001 | Mueamatsu | 349/58 |

FOREIGN PATENT DOCUMENTS

| | | |
|---|---|---|
| DE | 43 42 822 A1 | 8/1994 |
| EP | 0 751 340 A2 | 1/1997 |
| EP | 0 884 525 A2 | 12/1998 |
| GB | 1004319 | 9/1965 |
| JP | 5-136728 | 6/1993 |
| JP | 6-204910 | 7/1994 |
| JP | 9-203899 | 8/1997 |

\* cited by examiner

*Primary Examiner*—Sandra O'Shea
*Assistant Examiner*—Ismael Negron
(74) *Attorney, Agent, or Firm*—Pearne & Gordon LLP

(57) ABSTRACT

An illumination apparatus wherein in case a liquid-crystal display is lighted with plural colors using a body of luminous elements composed of plural luminous elements, a character, a mark and others can be also securely and plainly displayed so that a user can read the character, the mark, the digit and others and in addition, the system is not large-sized, and mobile information equipment provided with the illumination apparatus. The apparatus includes a printed board, a body of luminous elements in which plural luminous elements mounted on the printed board and different in a wavelength are integrated, a light conductor provided with light conducting means for conducting light to a predetermined surface from the body of luminous elements as a light source and an approximately rectangular liquid-crystal display held by the light conductor for displaying a character, a mark, a digit and others with them irradiated by the light conducting means are provided, light incident on the incident part of the light conductor is conducted, reflecting on a reflecting surface and an incidence plane and the whole liquid-crystal display is lighted.

30 Claims, 13 Drawing Sheets

DIFFUSED REFRECTION SURFASE

LCD DISPLAY WITH MULTI-COLOR ILLUMINATION MEANS

BACKGROUND OF THE INVENTION

The present invention relates to an illumination apparatus used for mobile electronic equipment such as a mobile telephone and a pager and others, particularly relates to an illumination apparatus composed so that a liquid crystal display for displaying a character, a mark and others is illuminated with using plural luminous elements different in a wavelength.

A conventional type mobile telephone is disclosed in JP-A-5-136728, the display of which has means for notifying by cyclically sequentially switching light sources respectively having at least two types of self-luminous colors for lighting a display as means other than means for notifying by a ringer to send a ring tone from a sounding body such as a loud speaker and a piezoelectric buzzer. Also, means for informing a user of the working condition of equipment by notifying only the change of luminescent color is disclosed in JP-A-6-204910.

For structure for lighting a display, a liquid crystal display (LCD) in which a light conducting plate having a curved surface for conducting light from a light emitting diode (LED) is built and others are disclosed in JP-A-9-203899.

However, in the configuration, as means for uniformly lighting a character, a mark or the periphery respectively displayed on the display is not disclosed though the display can be lighted, it can be notified to a user only that light-source colors are switched or a user can recognize only that luminescent colors are switched and there is a problem that displayed character, mark and others can be definitely read.

Particularly, the display of a mobile telephone is provided with a function for displaying a telephone number and others of an originator when a call is received, however, as a character cannot be precisely read in case lighted light has some grades in density on the screen, a character, a mark, a digit and others respectively displayed so that they are notified to a user and are read by the user may be prevented from being read because of the irregular color of lighted light. Further, in case the display which is also a part of the appearance of the equipment has irregular color, the appearance quality may be deteriorated.

The problem of irregular color can be avoided in case luminous elements are continuously provided, however, in case multiple luminous elements are used, the cost is increased. The display of a mobile telephone is manufactured so that it has the width of approximately 30 to 50 mm to enable operation by one hand.

However, in case the display having the width is lighted by one body of luminous elements, it is warped. Normally, devices are mounted on a printed board by surface mounting by a reflow, however, in case a device is warped, a defective part of soldering occurs and normal mounting is disabled.

SUMMARY OF THE INVENTION

The present invention is made in view of the problems described above and the object is to provide an illumination apparatus wherein in case a liquid-crystal display is lighted in plural colors using plural luminous elements, a character, a mark and others are also securely and definitely displayed and its user can read the character, the mark, a digit and others and in addition, the system is not large-sized and mobile information equipment provided with the illumination apparatus.

To achieve the object, an illumination apparatus according to a first aspect of the invention comprises: a printed board; a group of luminous elements in which plural luminous elements mounted on the printed board and different in a wavelength are arranged at a short interval; light conducting means for conducting light incident on its incident part from the group of luminous elements as a light source; and an approximately rectangular liquid-crystal display for displaying a character, a mark, a digit and others with them irradiated by the light conducting means, in which light incident from the incident part of the light conducting means is conducted, reflecting on a reflecting surface and an incidence plane and the whole liquid-crystal display is illuminated.

Therefore, according to the first aspect of the invention, a point where beams of light are synthesized can be formed in an extremely close position to the luminous element by making light emitted from the luminous element incident on the incident part of the light conducting means and reflecting the incident light on the reflecting surface and the incidence plane of the light conducting means.

Also, an illumination apparatus according to a second aspect of the invention comprises: a printed board; a body of luminous elements in which plural luminous elements mounted on the printed board and different in a wavelength are integrated; light conducting means for conducting light incident on its incident part from the body of luminous elements as a light source; and an approximately rectangular liquid-crystal display for displaying a character, a mark, a digit and others with them irradiated by the light conducting means, in which light incident from the incident part of the light conducting means is conducted, reflecting on a reflecting surface and an incidence plane and the whole liquid-crystal display is lighted.

Therefore, according to the second aspect of the invention, a point where beams of light are synthesized can be formed in an extremely close position to the luminous element by making light emitted from the luminous element incident on the incident part of the light conducting means and reflecting the incident light on the reflecting surface and the incidence plane of the light conducting means.

Also, an illumination apparatus according to a third aspect of the invention comprises: a printed board; a group of luminous elements in which plural luminous elements mounted on the printed board and different in a wavelength are arranged at a short interval; light conducting means for conducting light incident on its incident part from the group of luminous elements as a light source; and an approximately rectangular liquid-crystal display for displaying a character, a mark, a digit and others with them irradiated by the light conducting means, in which the plural luminous elements that belong to the group are arranged at an interval in the same direction along one side of the liquid-crystal display and light incident from the incident part of the light conducting means is conducted, reflecting on a reflecting surface and an incidence plane and the whole liquid-crystal display is lighted.

Therefore, according to the third aspect of the invention, a point where beams of light are synthesized can be formed in an extremely close position to the luminous element by making light emitted from the luminous element incident on the incident part of the light conducting means and reflecting the incident light on the reflecting surface and the incidence plane of the light conducting means without arranging multiple luminous elements along one side of the liquid-crystal display.

Also, an illumination apparatus according to a fourth aspect of the invention comprises: a printed board; a body of luminous elements in which plural luminous elements mounted on the printed board and different in a wavelength are integrated; light conducting means for conducting light incident on its incident part from the body of luminous elements as a light source; and an approximately rectangular liquid-crystal display for displaying a character, a mark, a digit and others with them irradiated by the light conducting means, in which the plural luminous elements that belong to the body are arranged at an interval in the same direction along one side of the liquid-crystal display and light incident from the incident part of the light conducting means is conducted, reflecting on a reflecting surface and an incidence plane and the whole liquid-crystal display is lighted.

Therefore, according to the fourth aspect of the invention, a point where beams of light are synthesized can be formed in an extremely close position to the luminous element by making light emitted from the luminous element incident on the incident part of the light conducting means and reflecting the incident light on the reflecting surface and the incidence plane of the light conducting means without arranging multiple luminous elements along one side of the liquid-crystal display.

Also, an illumination apparatus according to a fifth aspect of the invention comprises: a printed board; a group of luminous elements in which plural luminous elements mounted on the printed board and different in a wavelength are arranged at a short interval; light conducting means for conducting light incident on its incident part from the group of luminous elements as a light source; and an approximately rectangular liquid-crystal display for displaying a character, a mark, a digit and others with them irradiated by the light conducting means, and light diffusing means is provided to the incident part.

Therefore, according to the fifth aspect of the invention, distance between a point where light emitted from one luminous element and light emitted from another luminous element are synthesized and the luminous elements can be extremely reduced by the light diffusing means provided to the incident part.

Also, an illumination apparatus according to a sixth aspect of the invention comprises: a printed board; a body of luminous elements in which plural luminous elements mounted on the printed board and different in a wavelength are integrated; light conducting means for conducting light incident on its incident part from the body of luminous elements as a light source; an approximately rectangular liquid-crystal display for displaying a character, a mark, a digit and others with them irradiated by the light conducting means; and light diffusing means provided to the incident part.

Therefore, according to the sixth aspect of the invention, distance between a point where light emitted from one luminous element and light emitted from another luminous element are synthesized and the luminous elements can be extremely reduced by the light diffusing means provided to the incident part.

Also, an illumination apparatus according to a seventh aspect of the invention comprises: a printed board; a group of luminous elements in which plural luminous elements mounted on the printed board and different in a wavelength are arranged at a short interval; light conducting means for conducting light incident on its incident part from the group of luminous elements as a light source; an approximately rectangular liquid-crystal display for displaying a character, a mark, a digit and others with them irradiated by the light conducting means, light diffusing means provided to the incident part and the plural luminous elements that belong to the group are arranged at an interval in the same direction along one side of the liquid-crystal display.

Therefore, according to the seventh aspect of the invention, distance between a point where light emitted from one luminous element and light emitted from another luminous element are synthesized and the luminous elements can be extremely reduced by the light diffusing means provided to the incident part without arranging multiple luminous elements along one side of the liquid-crystal display.

Also, an illumination apparatus according to an eighth aspect of the invention comprises: a printed board; a body of luminous elements in which plural luminous elements mounted on the printed board and different in a wavelength are integrated; light conducting means for conducting light incident on its incident part from the body of luminous elements as a light source; an approximately rectangular liquid-crystal display for displaying a character, a mark, a digit and others with them irradiated by the light conducting means; light diffusing means provided to the incident part and the plural luminous elements that belong to the body are arranged at an interval in the same direction along one side of the liquid-crystal display.

Therefore, according to the eighth aspect of the invention, distance between a point where light emitted from one luminous element and light emitted from another luminous element are synthesized and the luminous elements can be extremely reduced by the light diffusing means provided to the incident part without arranging multiple luminous elements along one side of the liquid-crystal display.

Also, an illumination apparatus according to a ninth aspect of the invention comprises: a printed board; a body of luminous elements in which plural luminous elements mounted on the printed board and different in a wavelength are integrated; light conducting means for conducting light incident on its incident part from the body of luminous elements as a light source an approximately rectangular liquid-crystal display for displaying a character, a mark, a digit and others with them irradiated by the light conducting means; light diffusing means provided to the incident part and the plural luminous elements that belong to the body are arranged in parallel at an interval in the direction of the liquid-crystal display.

Therefore, according to the ninth aspect of the invention, distance between a point where light emitted from one luminous element and light emitted from another luminous element are synthesized and the luminous elements can be extremely reduced by the light diffusing means provided to the incident part without arranging multiple luminous elements in parallel in the direction of the liquid-crystal display.

Also, an illumination apparatus according to a tenth aspect of the invention comprises: a printed boar; a body of luminous elements in which plural luminous elements mounted on the printed board and different in a wavelength are integrated; light conducting means for conducting light incident on its incident part from the body of luminous elements as a light source; an approximately rectangular liquid-crystal display for displaying a character, a mark, a digit and others with them irradiated by the light conducting means; light diffusing means provided to the incident part and the plural luminous elements that belong to the body are arranged in parallel at an interval in the direction of the liquid-crystal display.

Therefore, according to the tenth aspect of the invention, distance between a point where light emitted from one luminous element and light emitted from another luminous element are synthesized and the luminous elements can be extremely reduced by the light diffusing means provided to the incident part without arranging multiple luminous elements in parallel in the direction of the liquid-crystal display.

Also, an illumination apparatus according to an eleventh aspect of the invention comprises: a printed board; a luminous element mounted on the printed board; light conducting means for conducting light incident from the luminous element as a light source repeating reflection on plural reflecting surfaces; an approximately rectangular liquid-crystal display for displaying a character, a mark, a digit and others with them irradiated by the light conducting means, and light diffusing means provided to the reflecting surface on which first reflection is performed of the light conducting means.

Therefore, according to the eleventh aspect of the invention, distance between a point where light emitted from one luminous element and light emitted from another luminous element are synthesized and the luminous elements can be extremely reduced by the light diffusing means provided to the reflecting surface on which first reflection is performed of the light conducting means.

Also, an illumination apparatus according to a twelfth aspect of the invention comprises: a printed board; a group of luminous elements in which plural luminous elements mounted on the printed board and different in a wavelength are arranged at a short interval; light conducting means for conducting light incident from the group of luminous elements as a light source repeating reflection on plural reflecting surfaces; an approximately rectangular liquid-crystal display for displaying a character, a mark, a digit and others with them irradiated by the light conducting means; and light diffusing means provided to the reflecting surface on which first reflection is performed of the light conducting means.

Therefore, according to the twelfth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means.

Also, an illumination apparatus according to a thirteenth aspect of the invention comprises: a printed board; a body of luminous elements in which plural luminous elements mounted on the printed board and different in a wavelength are integrated; light conducting means for conducting light incident from the body of luminous elements as a light source repeating reflection on plural reflecting surfaces; an approximately rectangular liquid-crystal display for displaying a character, a mark, a digit and others with them irradiated by the light conducting means; and light diffusing means provided to the reflecting surface on which first reflection is performed of the light conducting means.

Therefore, according to the thirteenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means.

Also, an illumination apparatus according to a fourteenth aspect of the invention comprises: a printed board; a luminous element mounted on the printed board; light conducting means for conducting light incident from the luminous element as a light source repeating reflection-on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means and the plural luminous elements are arranged at an interval in the same direction along one side of the liquid-crystal display.

Therefore, according to the fourteenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements along one side of the liquid-crystal display.

Also, an illumination apparatus according to a fifteenth aspect of the invention comprises: a printed board; a group of luminous elements in which plural luminous elements mounted on the printed board and different in a wavelength are arranged at a short interval; light conducting means for conducting light incident from the group of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means and the plural luminous elements that belong to the group are arranged at an interval in the same direction along one side of the liquid-crystal display.

Therefore, according to the fifteenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements along one side of the liquid-crystal display.

Also, an illumination apparatus according to a sixteenth aspect of the invention comprises: a printed board; a body of luminous elements in which plural luminous elements mounted on the printed board and different in a wavelength are integrated; light conducting means for conducting light incident from the body of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means and the plural luminous elements that belong to the body are arranged at an interval in the same direction along one side of the liquid-crystal display.

Therefore, according to the sixteenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements along one side of the liquid-crystal display.

Also, an illumination apparatus according to a seventeenth aspect of the invention comprises: a printed board; a group of luminous elements in which plural luminous elements mounted on the printed board and different in a wavelength are arranged at a short interval; light conducting means for conducting light incident from the group of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means and the plural luminous elements that belong to the group are arranged in parallel at an interval in the direction of the liquid-crystal display.

Therefore, according to the seventeenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements in parallel in the direction of the liquid-crystal display.

Also, an illumination apparatus according to an eighteenth aspect of the invention comprises: a printed board; a body of luminous elements in which plural luminous elements mounted on the printed board and different in a wavelength are integrated; light conducting means for conducting light incident from the body of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means and the plural luminous elements that belong to the body are arranged in parallel at an interval in the direction of the liquid-crystal display.

Therefore, according to the eighteenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements in parallel in the direction of the liquid-crystal display.

Also, an illumination apparatus according to a nineteenth aspect of the invention comprises: a printed board; a luminous element mounted on the printed board; light conducting means for conducting light incident from the luminous element as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface are further provided.

Therefore, according to the nineteenth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means and the loss of reflected light can be removed by the shielding means provided to the reflecting surface on which the first reflection is performed for preventing light from being transmitted.

Also, an illumination apparatus according to a twentieth aspect of the invention comprises: a printed board; a group of luminous elements in which plural luminous elements mounted on the printed board and different in a wavelength are arranged at a short interval; light conducting means for conducting light incident from the group of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface are further provided.

Therefore, according to the twentieth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means and the loss of reflected light can be removed by the shielding means provided to the reflecting surface on which the first reflection is performed for preventing light from being transmitted.

Also, an illumination apparatus according to a twenty-first aspect of the invention comprises: a printed board; a body of luminous elements in which plural luminous elements mounted on the printed board and different in a wavelength are integrated; light conducting means for conducting light incident from the body of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface are further provided.

Therefore, according to the twenty-first aspect of the invention, distance between a point where light emitted from one luminous element and light emitted from another luminous element are synthesized and the luminous elements can be extremely reduced by the light diffusing means provided to the reflecting surface on which first reflection is performed of the light conducting means and the loss of reflected light can be removed by the shielding means provided to the reflecting surface on which the first reflection is performed for preventing light from being transmitted.

Also, an illumination apparatus according to a twenty-second aspect of the invention comprises: a printed board; a luminous element mounted on the printed board; light conducting means for conducting light incident from the luminous element as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface, in which the plural luminous elements are arranged at an interval in the same direction along one side of the liquid-crystal display.

Therefore, according to the twenty-second aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements along one side of the liquid-crystal display and the loss of reflected light can be removed by the shielding means provided to the reflecting surface on which the first reflection is performed for preventing light from being transmitted.

Also, an illumination apparatus according to a twenty-third aspect of the invention comprises: a printed board; a group of luminous elements in which plural luminous elements mounted on the printed board and different in a wavelength are arranged at a short interval; light conducting means for conducting light incident from the group of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface, in which the plural luminous elements that belong to the group are arranged at an interval in the same direction along one side of the liquid-crystal display.

Therefore, according to the twenty-third aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements along one side of the liquid-crystal display and the loss of reflected light can be removed by the shielding means provided to the reflecting surface on which the first reflection is performed for preventing light from being transmitted.

Also, an illumination apparatus according to a twenty-fourth aspect of the invention comprises: a printed board; a body of luminous elements in which plural luminous elements mounted on the printed board and different in a wavelength are integrated; light conducting means for conducting light incident from the body of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface, in which the plural luminous elements that belong to the body are arranged at an interval in the same direction along one side of the liquid-crystal display.

Therefore, according to the twenty-fourth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements along one side of the liquid-crystal display and the loss of reflected light can be removed by the shielding means provided to the reflecting surface on which the first reflection is performed for preventing light from being transmitted.

Also, an illumination apparatus according to a twenty-fifth aspect of the invention comprises: a printed board; a group of luminous elements in which plural luminous elements mounted on the printed board and different in a wavelength are arranged at a short interval; light conducting means for conducting light incident from the group of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface, in which the plural luminous elements that belong to the group are arranged in parallel at an interval in the direction of the liquid-crystal display.

Therefore, according to the twenty-fifth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements in parallel in the direction of the liquid-crystal display and the loss of reflected light can be removed by the shielding means provided to the reflecting surface on which the first reflection is performed for preventing light from being transmitted.

Also, an illumination apparatus according to a twenty-sixth aspect of the invention comprises: a printed board; a body of luminous elements in which plural luminous elements mounted on the printed board and different in a wavelength are integrated; light conducting means for conducting light incident from the body of luminous elements as a light source repeating reflection on plural reflecting surfaces; an approximately rectangular liquid-crystal display for displaying a character, a mark, a digit and others with them irradiated by the light conducting means; light diffusing means provided to the reflecting surface on which first reflection is performed of the light conducting means; and shielding means for preventing light from being transmitted to the reflecting surface, in which the plural luminous elements that belong to the body are arranged in parallel at an interval in the direction of the liquid-crystal display.

Therefore, according to the twenty-sixth aspect of the invention, distance between a point where light emitted from one luminous element and light emitted from another luminous element are synthesized and the luminous elements can be extremely reduced by the light diffusing means provided to the reflecting surface on which first reflection is performed of the light conducting means without arranging multiple luminous elements in parallel in the direction of the liquid-crystal display and the loss of reflected light can be removed by the shielding means provided to the reflecting surface on which the first reflection is performed for preventing light from being transmitted.

Also, an illumination apparatus according to a twenty-seventh aspect of the invention is based upon the illumination apparatus according to the first to the twenty-sixth aspects of the invention and is characterized in that the luminous elements can simultaneously emit light.

Therefore, according to the twenty-seventh aspect of the invention, the liquid crystal display can be lighted by light of more types than the types of luminous elements.

Also, an illumination apparatus according to a twenty-eighth aspect of the invention is based upon the illumination apparatus according to the first to the twenty-sixth aspects of the invention and is characterized in that the intensity of radiated light is varied by controlling current flowing in the luminous element.

Therefore, according to the twenty-eighth aspect of the invention, a range of display can be uniformly lighted by light of more types than the types of luminous elements without irregular color and the unevenness of brightness.

Also, mobile information equipment according to a twenty-ninth aspect of the invention is provided with the illumination apparatus according to the first to the twenty-eighth aspects of the invention.

Therefore, according to the twenty-ninth aspect of the invention, a range of display can be uniformly lighted without irregular color and the unevenness of brightness and without increasing consumed current in the mobile information equipment.

DETAILED DESCRIPTION OF THE PREFERRED EMBODIMENTS

Figure 1:
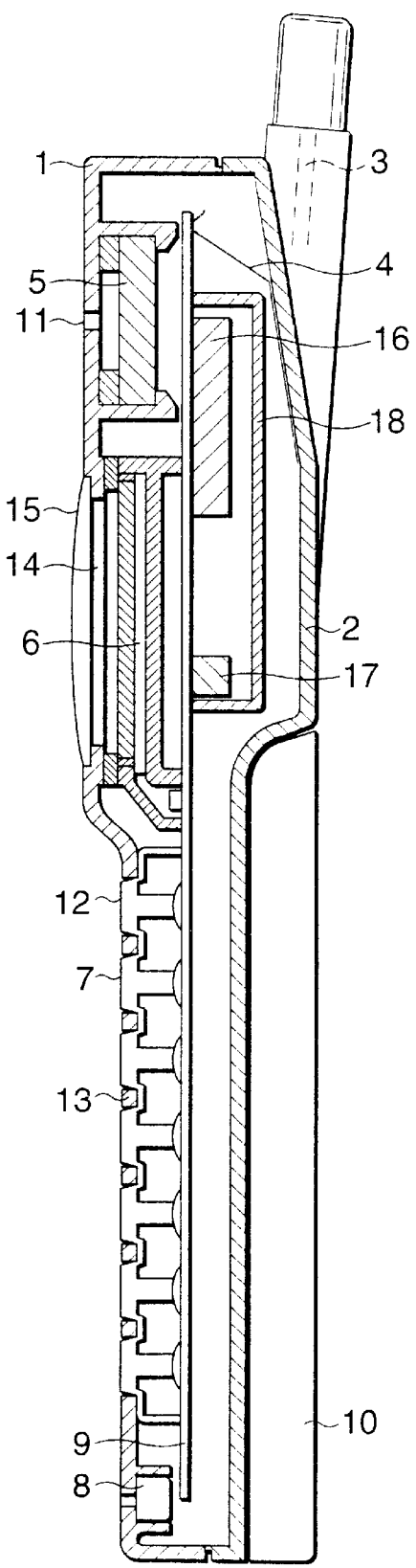
FIG. 1 is a longitudinal side sectional view showing a mobile telephone provided with an illumination apparatus equivalent to an embodiment of the invention.

Referring to the drawings, an embodiment of the present invention will be described below. FIG. 1 is a longitudinal section showing mobile information equipment provided with an illumination apparatus equivalent to the embodiment of the present invention (may be simply called equipment) such as a mobile telephone.

As shown on FIG. 1, in the body of the equipment formed by an upper case 1 and a lower case 2, an antenna 3 for sending and receiving, an antenna 4 for receiving, a receiver 5 that outputs voice, a liquid crystal display assembly 6 that displays a character, a mark and others, a key sheet 7 on which a character and a mark are printed, a microphone 8, a body printed board 9 and others are housed and a battery 10 for supplying power is installed outside the body.

A voice hole 11 for transmitting voice generated by the receiver 5 outside the body, key holes 13 into each of which each projection 12 of the key sheet 7 is inserted and the number of which is equal to that of the projections 12, an opening 14 the size of which is equal to that of the liquid crystal display 6 and others are provided to the upper case 1, and the opening 14 is covered with a transparent window 15 so that a character, a mark and others respectively displayed on the liquid crystal display 6 can be recognized and read by a user.

An oscillator for controlling an oscillation frequency with voltage (hereinafter called VCO), a temperature compensated crystal oscillator for stably controlling a frequency (hereinafter called VC-TCXO), plural resistors, plural capacitors and others are mounted on the back face of the body printed board 9, a receiving circuit 16 is formed by a low noise amplifier, a first mixer and others, and a modulator, a power amplifier (hereinafter called PA), plural resistors, plural capacitors and others are mounted on the surface to be a sending circuit 17. These receiving circuit 16 and sending circuit 17 are shielded by a shield case 18 made of resin for preventing an electromagnetic wave from invading from the outside.

The shield case 18 is formed by resin material such as acrylonitrile-butadiene-styrene (ABS), an electromagnetic wave is prevented from being transmitted by applying electroless copper plating to the surface, further electroless nickel plating is applied to the surface and processing for preventing electroless copper plating from being rusted is performed.

Figure 2:
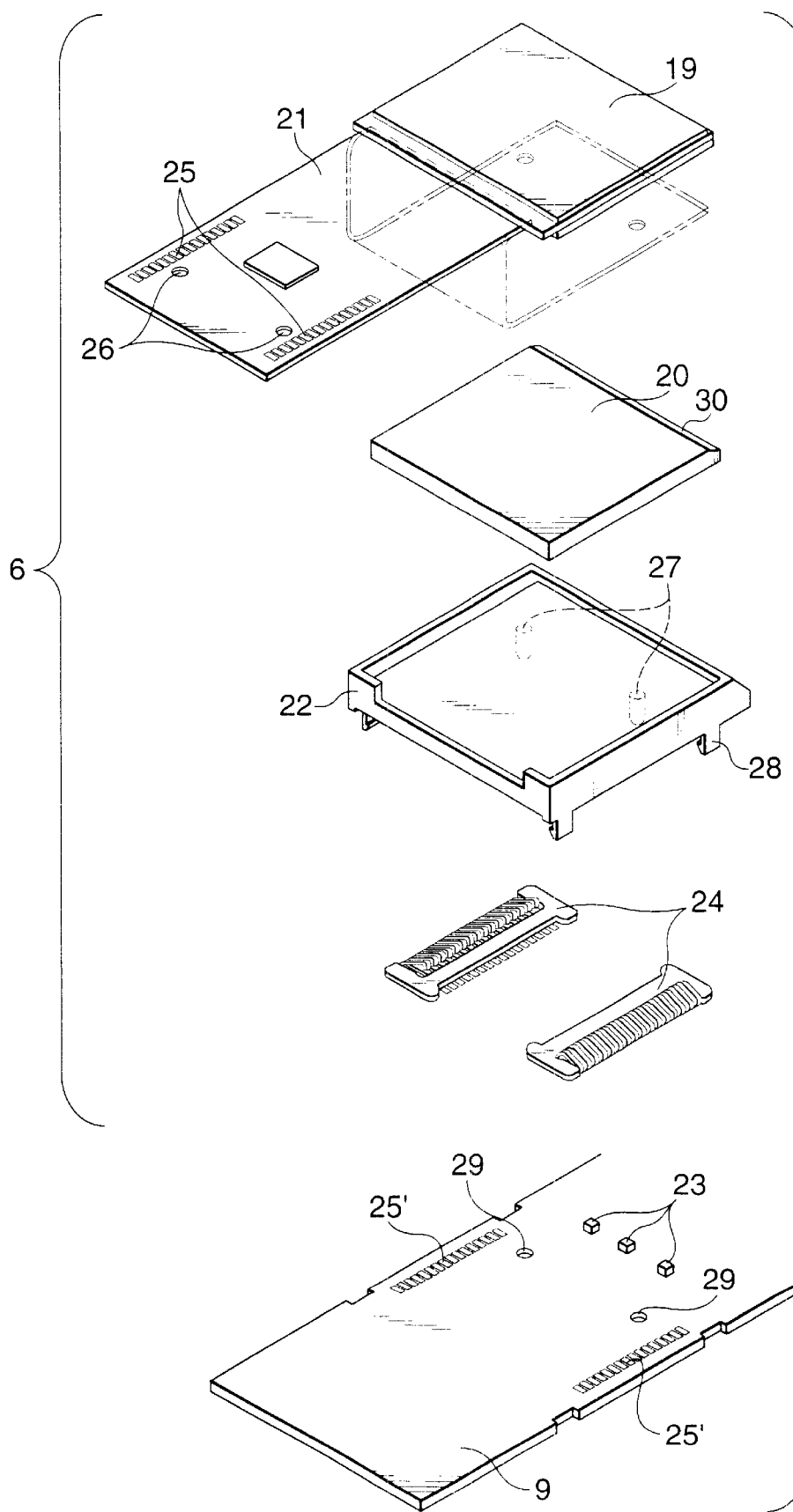
FIG. 2 shows the configuration of a liquid crystal display in the embodiment of the invention.

Next, the configuration of the liquid crystal display assembly 6 will be described in detail. FIG. 2 shows the liquid crystal display in the embodiment of the present invention.

As shown in FIG. 2, the liquid crystal display assembly 6 is composed of a holding member 22 for holding a liquid-crystal display 19, a light conductor 20 and a flexible board 21, a body of luminous elements 23 and springs 24 formed by molding an electrically conductive spring out of resin ad mounted on the printed board 9.

In the liquid-crystal display 19, a liquid-crystal display element and a transparent electrode are sealed between two glass plates. One glass of the liquid-crystal display 19 is formed so that it is longer to some extent than the other glass, and the sealed transparent electrode and the flexible board 21 are connected to the longer part by a conductive adhesive. The flexible board 21 is substantially rectangular, a terminal electrically connected to the exposed transparent electrode is formed on one side, a driver connected to the terminal for driving the liquid-crystal display is mounted in the center and contacts 25 electrically connected to the driver and exposed on the surface are formed so that right contacts and left contacts are uniform. Two through holes for positioning 26 are provided on the reverse side to the terminal.

The light conductor 20 is an opalescent transparent plate made of resin, an incident part and a reflecting part are formed in a part opposite to the body of luminous elements 23 mounted on the printed board 9 and further, one side or both sides are roughed. The holding member 22 is made of white resin, the light conductor 20 is loaded onto the surface of the holding member, a part connected to the transparent electrode of the liquid-crystal display 19 by the conductive adhesive and others beforehand at the end of the flexible board 21 connected to the liquid-crystal display 19 is protruded above the light conductor 20 and further, the flexible board is turned down to the back side of the holding member approximately in the shape of a letter U.

Two bosses for positioning 27 provided on the back side of the holding member 22 are respectively inserted into the two through holes for positioning 26 provided to the side of the end of the flexible board 21 and the flexible board is positioned. Therefore, the contacts 25 of the flexible board 21 are opposed to the spring 24 mounted on the printed board 9. That is, the groups of contacts 25 provided to the flexible board 21 are arranged so that the groups are symmetrical along each lateral side of the flexible board 21 and the springs 24 respectively corresponding to the contacts 25 are also arranged so that they are symmetrical.

For the body of luminous elements 23, a first luminous element that emits light having a first wavelength (a luminous element may be also called a light emitting diode), a second luminous element that emits light having a second wavelength and a third luminous element that emits light having a third wavelength respectively by energizing the luminous elements are held with resin by one piece. The body of luminous elements 23 are mounted at an interval of L on the printed board 9 in the order of the first, second and third luminous elements in the direction of the right side of the equipment along a side opposite to one side on which the flexible board 21 of the liquid-crystal display 19 is connected and all luminous elements included in the body of luminous elements 23 radiate light upward.

Next, the hooking claw 28 of the holding member 22 where the liquid-crystal display 19 and others are built and held as described above is hooked on a concave portion provided to a predetermined position of the printed board 9, that is, the longitudinal side of the printed board 9 and the boss for positioning 27 of the holding member 22 is inserted into a hole for positioning 29 provided to the printed board 9. As a result, the contacts 25 of the flexible board 21 turned down to the back side of the holding member 22 where the liquid-crystal display 19 and others are built and held and the pressing part of the spring 24 are pressed by the force of the spring.

The body of luminous elements 23 is housed in the holding member 22 and the periphery of the body of luminous elements 23 is touched to the printed board 9 to prevent light radiated from the body of luminous elements 23 from leaking out through clearance between the body of luminous elements and the printed board 9.

The liquid crystal display 6 attached to the printed board 9 is housed in the body, the opening 14 for enabling a character, a mark, a digit and others displayed on the liquid-crystal display 19 to be seen from the outside is provided in the body and further, the opening 14 is covered with the transparent window 15. A cushion 31 in the shape of a hollow square is provided between the liquid crystal display 6 and the upper case 1 to prevent dust and others from invading on the liquid crystal display 6 from the outside.

Figure 3:
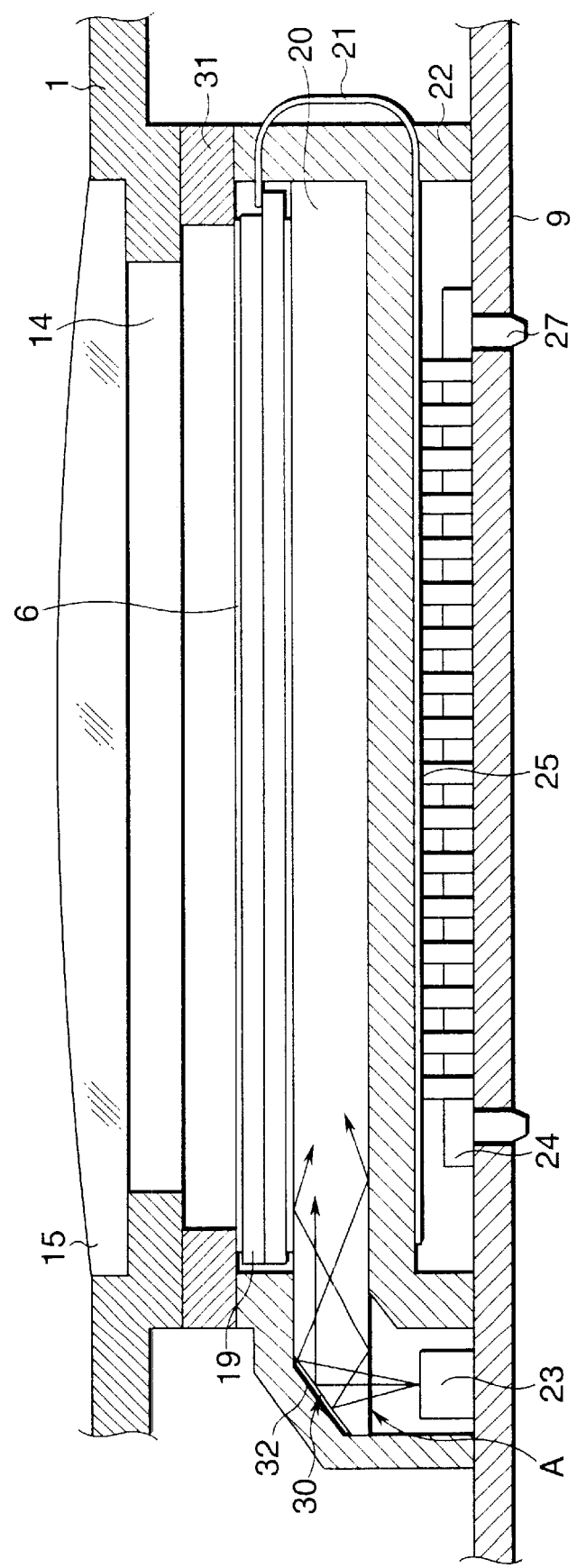
FIG. 3 is a local longitudinal section showing the liquid crystal display in case a body of luminous elements is crosswise put.

Next, the configuration for irradiating the liquid crystal display assembly 6 will be described in detail. FIG. 3 is a local longitudinal section showing the liquid crystal display assembly 6 and in this case, the body of luminous elements 23 formed by integrating plural luminous elements is arranged along one side of the liquid-crystal display 19, light emitted from all the luminous elements is incident on an incident part A provided to the same position and is reflected in a reflecting part 30 so that the unevenness of the luminance of an irradiated part can be removed by utilizing the same light conducting means.

That is, as shown in FIG. 3, light radiated from the body of luminous elements 23 is incident on the incident part A of the light conductor 20, is reflected in the reflecting part 30 provided along a tilted surface of the holding member 22 and the light is conducted into the light conductor 20. Some of the reflected light is further reflected on an incidence plane on which the incident part A is formed. As described above, light incident on the light conductor 20 is conducted to the whole light conductor. Shielding means 32 for preventing light from being transmitted may be also provided to the tilted surface of the holding member 22.

The shielding means 32 may be also printed in white on the tilted surface, a shielding tape may be also attached as the shielding means and to compose the shielding means at a low cost, the slant face has only to be touched to a white holding member. However, clearance may be made between the white holding member and the slant face depending upon dimensional tolerance and as optical path length is extended by the clearance, illuminance is deteriorated. Therefore, preferably, as the former more securely shields, a range of display can be more brightly lighted.

Therefore, as light radiated by one luminous element 23 and light radiated by another luminous element 23 are reflected on the slope of the reflecting part 30 formed in the light conductor 20 and a point where beams of light described above are synthesized can be formed in an extremely close position to the light-emitting part of the luminous element, a range of display can be lighted without unevenness from the near end to the remote end.

A mark, a character, a digit and others or the periphery respectively displayed on the liquid-crystal display 19 are lighted from the back by lightening the whole region of the light conductor 20 as described above and the displayed mark, character, digit and others can be plainly seen from the front through the transparent window 15.

Figure 4:
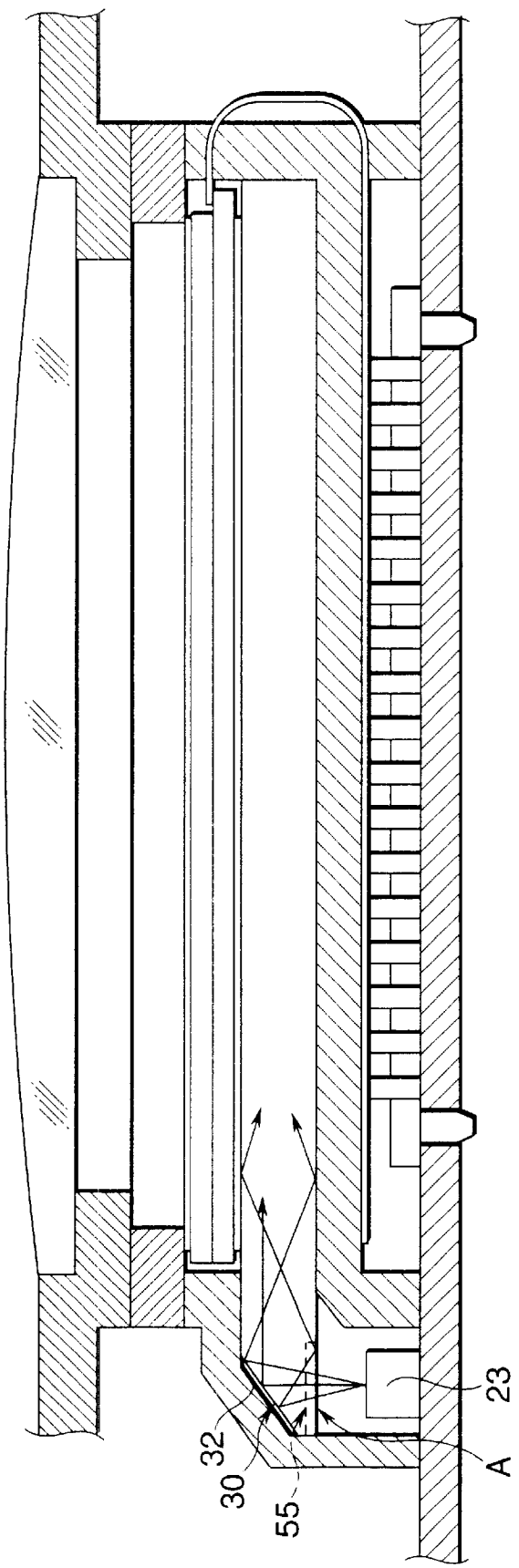
FIG. 4 is a local longitudinal section showing the liquid crystal display in case the body of luminous elements is crosswise put and light diffusing means is provided to an incident part.

FIG. 4 is a local longitudinal section showing the liquid crystal display assembly 6 as FIG. 3 and in this case, bodies of luminous elements 23 in each of which plural luminous elements are integrated are arranged along one side of the liquid-crystal display 19, light emitted from all luminous elements is incident from the incident part provided to the same position, is reflected in the reflecting part 30 via light diffusing means 55 provided to the incident part A and the unevenness of luminance depending upon a lighted part can be removed by utilizing the same light conducting means.

Figure 5:
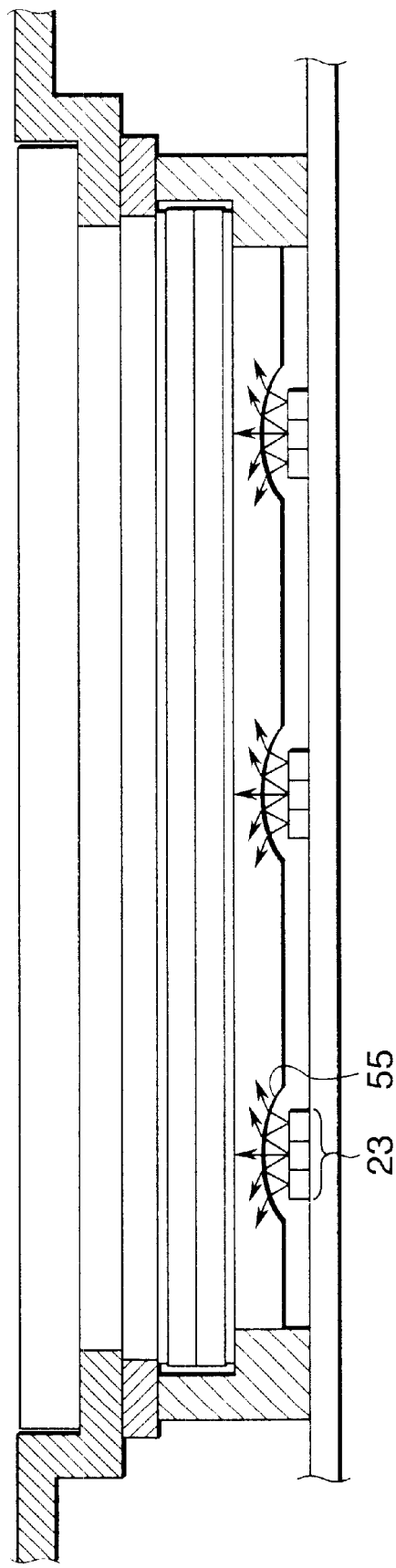
FIG. 5 is a local cross-sectional view showing the liquid crystal display in case the body of luminous elements is crosswise put and the light diffusing means is provided to the incident part.

That is, as shown in FIG. 4, light radiated by the body of luminous elements 23 is incident on the incident part A of the light conductor 20 and passes the light diffusing means 55 provided to the incident part A. The situation will be understood referring to a local cross-sectional view shown in FIG. 5 viewed from a position different from FIG. 4 by 90°.

Some of diffused light is reflected in the reflecting part 30 provided along the slant face of the holding-member 22 and is conducted into the light conductor 20. Reflected light is further reflected on the incidence plane on which the incident part A is formed. Diffused light is directly incident on the light conductor 20.

Light incident on the light conductor 20 as described above is conducted into the whole light conductor. As described above, the shielding means 32 for preventing light from being transmitted may be also provided to the tilted surface of the holding member 22.

Therefore, as light radiated from one luminous element 23 and light radiated from another luminous element 23 are reflected on the slant face of the reflecting part 30, being diffused via the light diffusing means 55 formed in the light conductor 20 and a point where beams of light described above are synthesized can be formed in an extremely close position to the light-emitting part of the luminous element, a range of display can be lighted without unevenness from the near end to the remote end.

Figure 6:
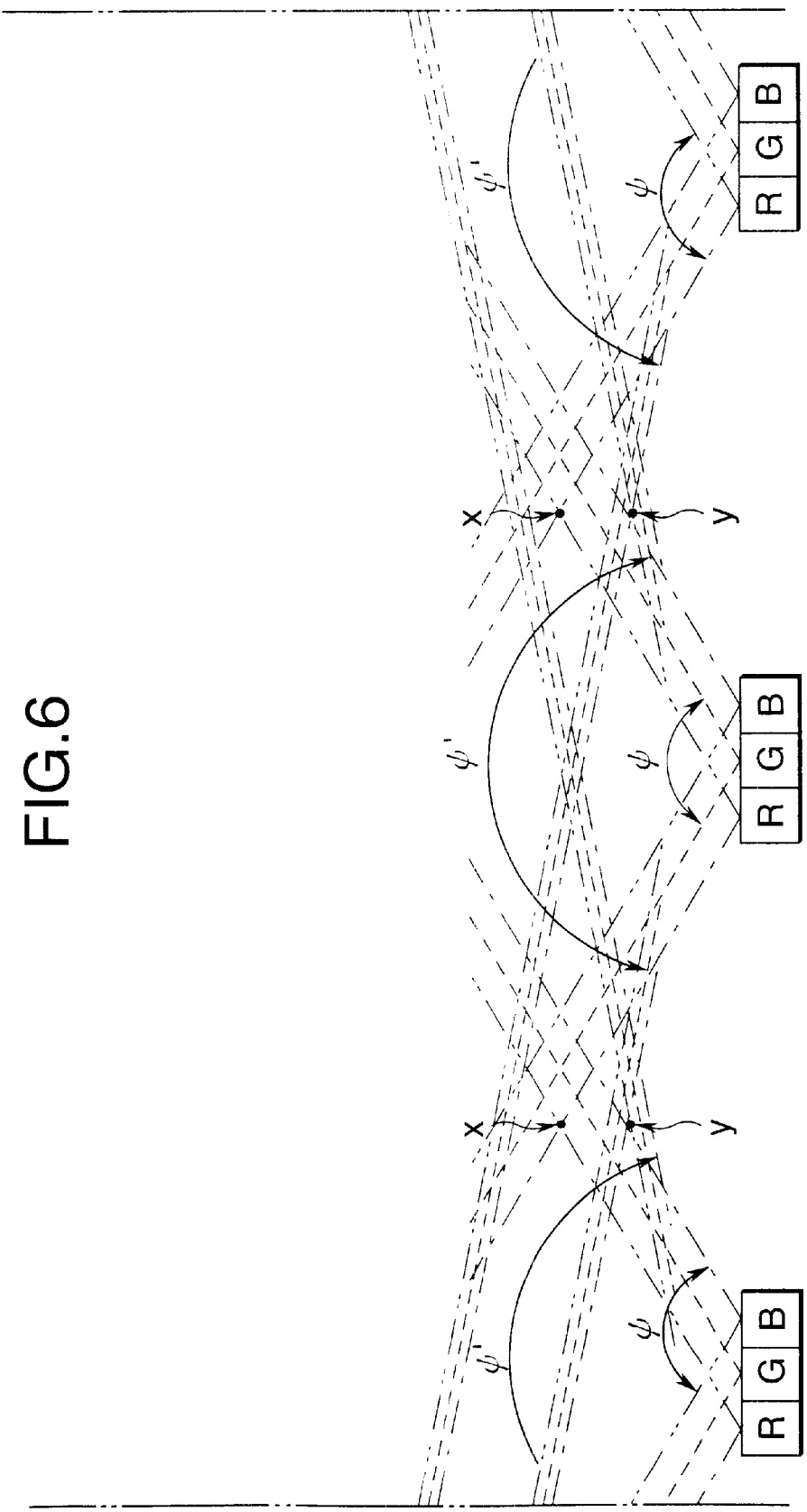
FIG. 6 shows optical paths of light emitted from the body of luminous elements in case the body of luminous elements is crosswise put.

FIG. 6 shows the optical paths of light emitted from the bodies of luminous elements arranged along one side of the liquid-crystal display in the embodiment of the invention.

As shown in FIG. 6, bodies of luminous elements in each of which the luminous element that emits blue light (B) having the wavelength of 400 to 500 nm on the right side, the luminous element that emits green light (G) having the wavelength of 500 to 600 nm in the center and the luminous element that emits red light (R) having the wavelength of 600 to 700 nm on the left side are integrated are arranged in the order of B, G and R from the right at an equal interval in the same direction. Order for arranging B, G and R is not necessarily limited to the order described above.

A case that light having the same wavelength is radiated from plural luminous elements will be described referring to FIG. 6 below. Light emitted from the luminous element R of the body of the luminous elements arranged in the center and light emitted from the luminous element R of the body of luminous elements adjacent on the left side form a point where beams of light described above are synthesized at a point X in case no light diffusing means 55 is provided. However, in case the light diffusing means 55 is provided, light radiated at the angle of radiation is diffused on the slant face on which the diffusing means 55 is provided after the light is incident on the light conductor and as a result, the angle of radiation is larger than the original angle $\psi$ of radiation. The angle of radiation at this time after diffusion is $\psi'$, in FIG. 6, an optical path is inflected on the reflecting surface on which the diffusing means 55 is provided and at this time, a point where beams of light described above are synthesized is formed at a point Y. The relationship between light emitted from the luminous element R of the body of luminous elements arranged in the center and light emitted from the luminous element R of the body of luminous elements adjacent on the right side is similar to the relationship described above. The relationship between respective light from the luminous elements G and B of another body of luminous elements is similar to the relationship described above.

As a point where beams of light are synthesized is formed in an extremely close position to a body of luminous elements as described above, a range of display in the liquid-crystal display can be lighted without the unevenness of luminance.

Figure 7:
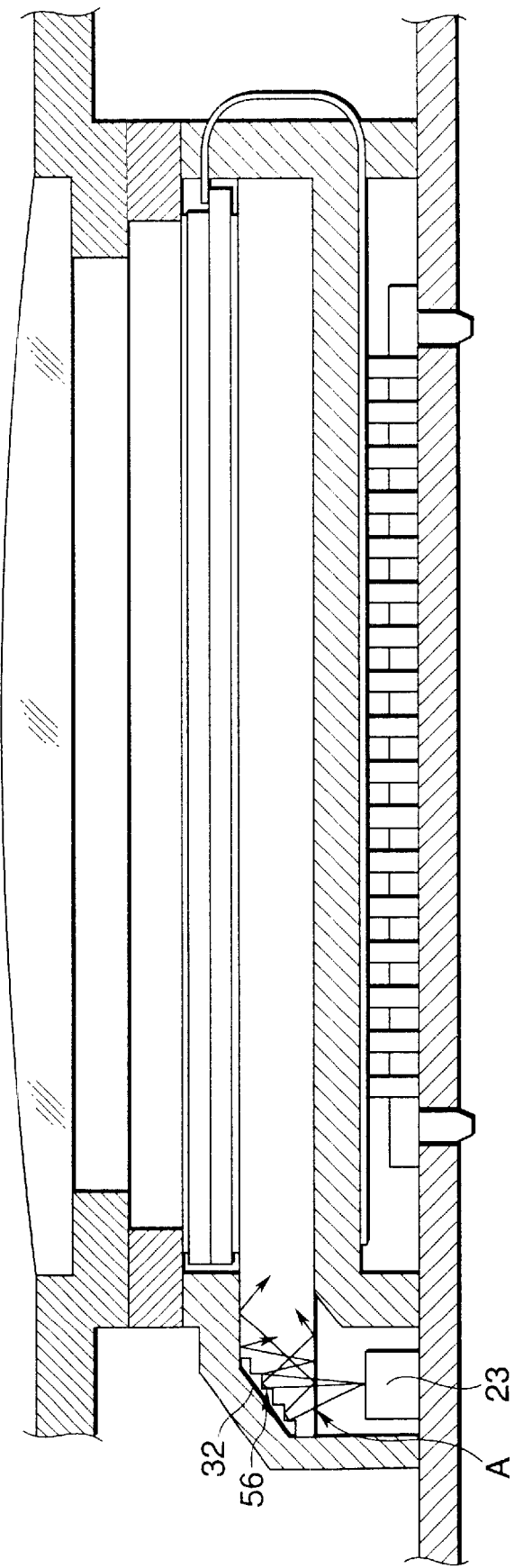
FIG. 7 is a local longitudinal section showing the liquid crystal display in case the light diffusing means is provided to a reflecting part.

FIG. 7 is a local longitudinal section showing the liquid crystal display assembly 6 as FIG. 3, in this case, bodies of luminous elements 23 in each of which plural luminous elements are integrated are arranged along one side of the liquid-crystal display 19, light emitted from all luminous elements is incident from the incident part provided to the same position, the light is diffused and reflected by the light diffusing means 56 provided to the reflecting surface on which first reflection is performed of the light conductor 20 and the unevenness of luminance in a lighted part can be removed by utilizing the same light conducting means. The light diffusing means 56 is acquired by roughing the reflecting surface on which first reflection is performed.

That is, as shown in FIG. 7, light radiated from the body of luminous elements 23 is incident on the incident part A of the light conductor 20, is diffused and reflected by the light diffusing means 56 provided to the reflecting surface on which first reflection is performed of the light conductor 20 along the slant face of the holding member 22 and is conducted into the light conductor 20. The diffused and reflected light is further reflected on the incidence plane on which the incident part A is formed. A part of the diffused light is directly incident on the light conductor 20.

Light incident on the light conductor 20 is conducted into the whole light conductor as described above. As described above, the shielding means 32 for preventing light from being transmitted can be provided to the slant face of the holding member 22.

Therefore, as light radiated from one body of luminous elements 23 and light radiated from another body of luminous elements 23 are reflected, being diffused via the light diffusing means 56 formed on the light conductor 20 and a point where beams of light described above are synthesized can be formed in an extremely close position to the light-emitting part of the luminous element, a range of display can be lighted without unevenness from the near end to the remote end.

Figure 8:
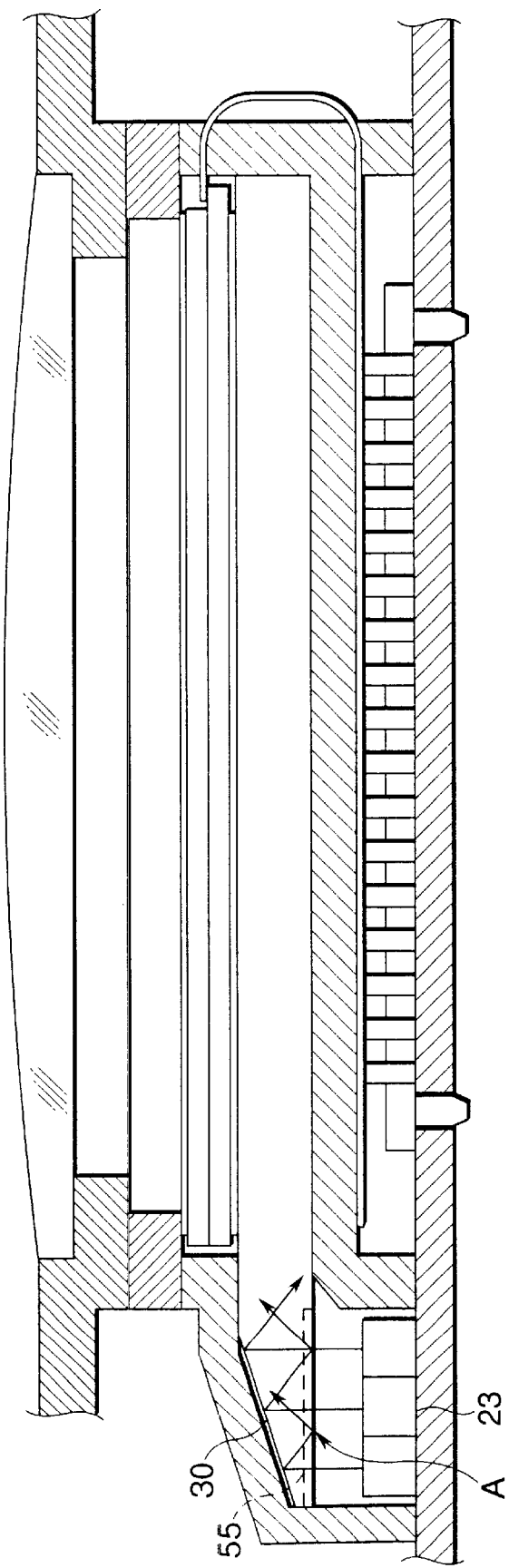
FIG. 8 is a local cross-sectional view showing the liquid crystal display in case the body of luminous elements is longitudinally put and the light diffusing means is provided to the incident part.

FIG. 8 is a local longitudinal section showing the liquid crystal display 6 when the body of luminous elements 23 is directed on the side of the liquid-crystal display 19, in this case, bodies of luminous elements 23 in each of which plural luminous elements are integrated are arranged in parallel at an interval in the direction of the liquid-crystal display 19, light emitted from all luminous elements is incident on the incident part A provided to the same position, further, is reflected in the reflecting part 30 via the light diffusing means 55 provided to the incident part A and the unevenness of luminance in a lighted part can be removed by utilizing the same light conducting means.

Figure 9:
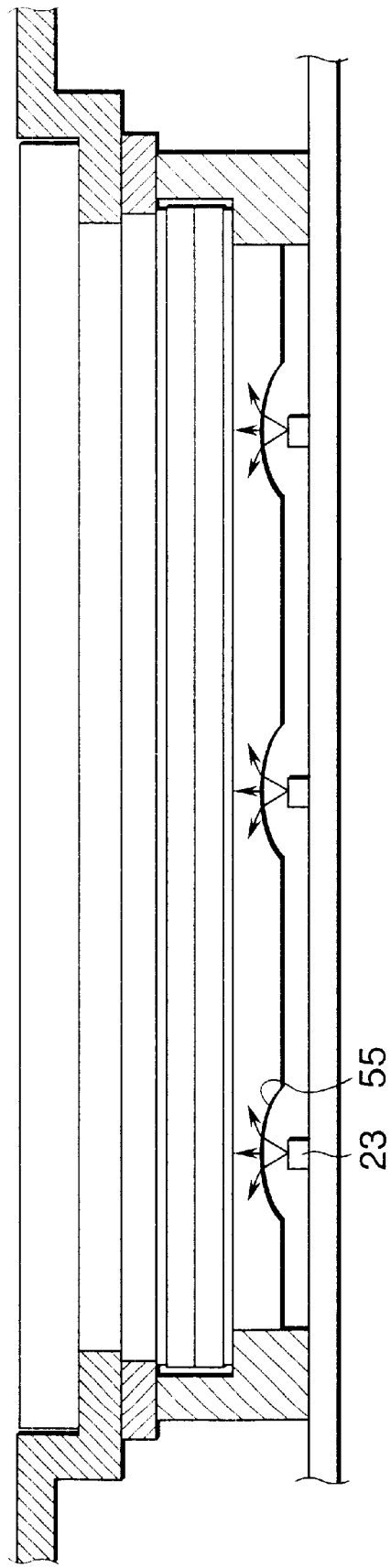
FIG. 9 is a local cross-sectional view showing the liquid crystal display in case the body of luminous elements is longitudinally put and the light diffusing means is provided to the reflecting part.

That is, as shown in FIG. 8, light radiated from the body of luminous elements 23 is incident on the incident part A of the light conductor 20 and passes the light diffusing means 55 provided to the incident part A. The situation will be understood referring to a local cross-sectional view shown in FIG. 9 viewed from a position different from FIG. 8 by 90°.

Some of diffused light is reflected in the reflecting part 30 provided along the slant face of the holding member 22 and is conducted into the light conductor 20. Also, reflected light is further reflected on the incidence plane on which the incident part A is formed. Also, diffused light is directly incident on the light conductor 20.

Light incident on the light conductor 20 as described above is conducted into the whole light conductor. As described above, the shielding means 32 for preventing light from being transmitted can be provided to the slant face of the holding member 22.

Therefore, as light radiated from one body of luminous elements 23 and light radiated from another body of luminous elements 23 are reflected on the slant face of the reflecting part 30, being diffused via the light diffusing means 55 formed in the light conductor 20 and a point where beams of light described above are synthesized can be formed in an extremely close position to the light-emitting part of the luminous element, a range of display can be lighted without unevenness from the near end to the remote end.

A mark, a character, a digit and others or the periphery respectively displayed on the liquid-crystal display 19 are lighted from the back by lightening the whole region of the light conductor 20 as described above and the displayed mark, character, digit and others can be plainly seen from the front via the transparent window 15.

Figure 10:
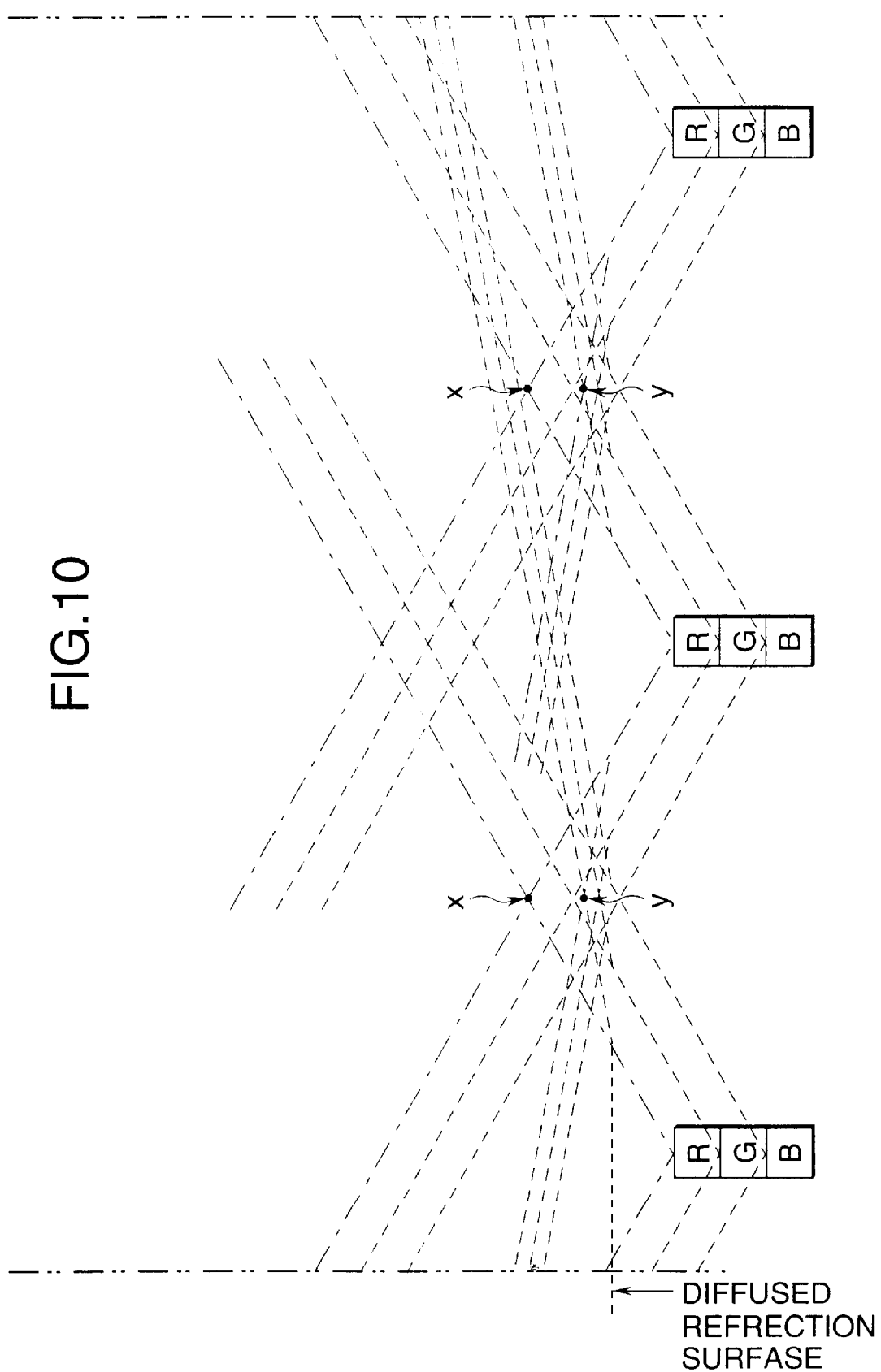
FIG. 10 shows optical paths of light emitted from the body of luminous elements in case the body of luminous elements is longitudinally put.

FIG. 10 shows the optical paths of light emitted from the bodies of luminous elements arranged in parallel at an interval in the direction of the liquid-crystal display 19 in the embodiment of the invention.

As shown in FIG. 10, bodies of luminous elements in each of which a luminous element that emits red light R having the wavelength of 600 to 700 nm at the front, a luminous element that emits green light G having the wavelength of 500 to 600 nm in the center and a luminous element that emits blue light B having the wavelength of 400 to 500 nm at the back are integrated are arranged in the order of R, G and B from the front in parallel at an equal interval in the direction of the liquid-crystal display 19. Order in which R, G and B are arranged is not necessarily limited to the order described above.

Referring to FIG. 10, a case that light of the same wavelength is radiated from plural luminous elements will be described below. Light emitted from the luminous element R of the body of luminous elements arranged in the center and light emitted from the luminous element R of the body of luminous elements adjacent on the left side form a point where beams of light described above are synthesized at a point X in case no light diffusing means 55 is provided. However, as the light diffusing means 55 is provided, a point where beams of light described above are synthesized is formed at a point Y. A diffused reflection plane by the luminous element R of the body of luminous elements is closer than the point where beams of light described above are synthesized Y and a range of display by irregularly reflected light can be further closer.

The relationship between light emitted from the luminous element R of the body of luminous elements arranged in the center and light emitted from the luminous element R of the body of luminous elements adjacent on the right side is similar to the relationship described above. Also, the relationship between respective light from luminous elements G and B of another body of luminous elements is similar to the relationship described above though the position of a point where respective light is synthesized is different.

As a point where beams of light are synthesized is formed in an extremely close position to a body of luminous elements as described above, the liquid-crystal display can be lighted without the unevenness of luminance in a range of display.

Figure 11:
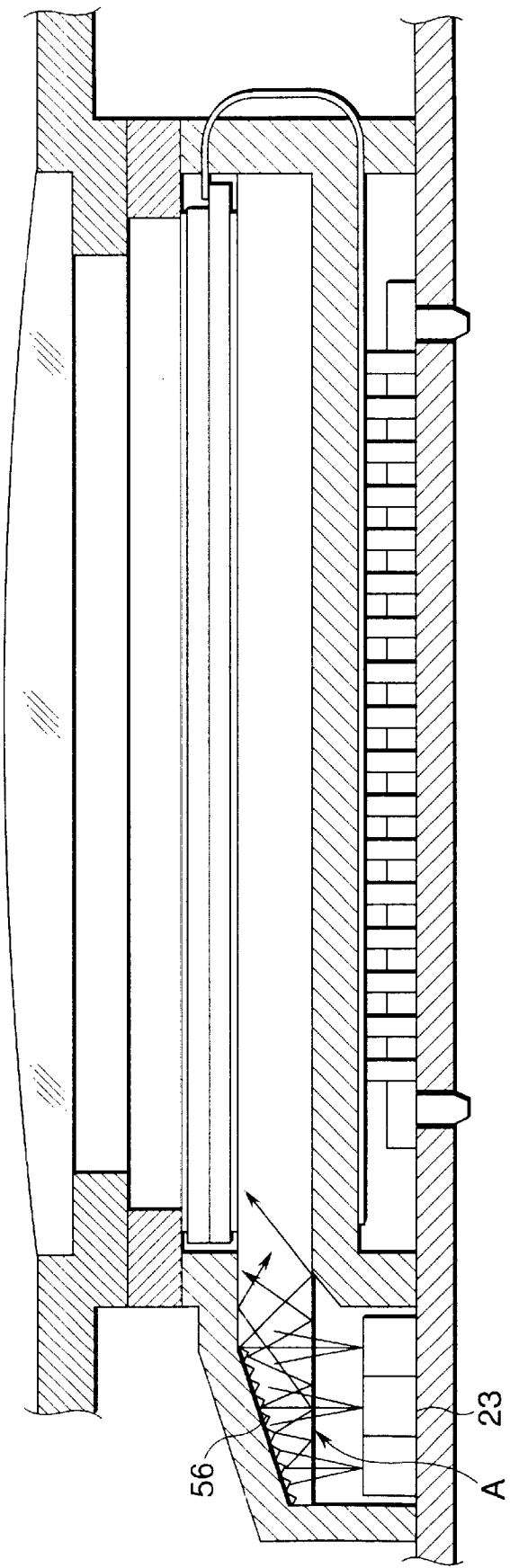
FIG. 11 is a local longitudinal section showing the liquid crystal display in case the body of luminous elements is longitudinally put and the light diffusing means is provided to the reflecting part.

FIG. 11 is a local longitudinal section showing the liquid crystal display assembly 6 as FIG. 8, in this case, bodies of luminous elements 23 in each of which plural luminous elements are integrated are arranged in parallel at an interval in the direction of the liquid-crystal display 19, light emitted from all luminous elements in incident on the incident part A provided to the same position, the light is diffused and reflected by the light diffusing means 56 provided to the reflecting surface on which first reflection is performed of the light conductor 20 and the unevenness of luminance in a lighted part can be removed by utilizing the same light conducting means.

That is, as shown in FIG. 11, light radiated from the body of luminous elements 23 is incident on the incident part A of the light conductor 20, is diffused and reflected by the light diffusing means 56 provided to the reflecting surface on which first reflection is performed of the light conductor 20 along the slant face of the holding member 22 and is conducted into the light conductor 20. Also, the diffused and reflected light is further reflected on the incidence plane on which the incident part A is formed. A part of the diffused light is directly incident on the light conductor 20.

Light incident on the light conductor 20 as described above is conducted into the whole light conductor. As described above, the shielding means 32 for preventing light from being transmitted can be provided to the slant face of the holding member 22.

Therefore, as light radiated from one body of luminous elements 23 and light radiated from another body of luminous elements 23 are reflected, being diffused via the light diffusing means 56 formed in the light conductor 20 and a point where beams of light described above are synthesized can be formed in an extremely close position to the light-emitting part of the luminous element, a range of display can be lighted without unevenness from the near end to the remote end.

Figure 12:
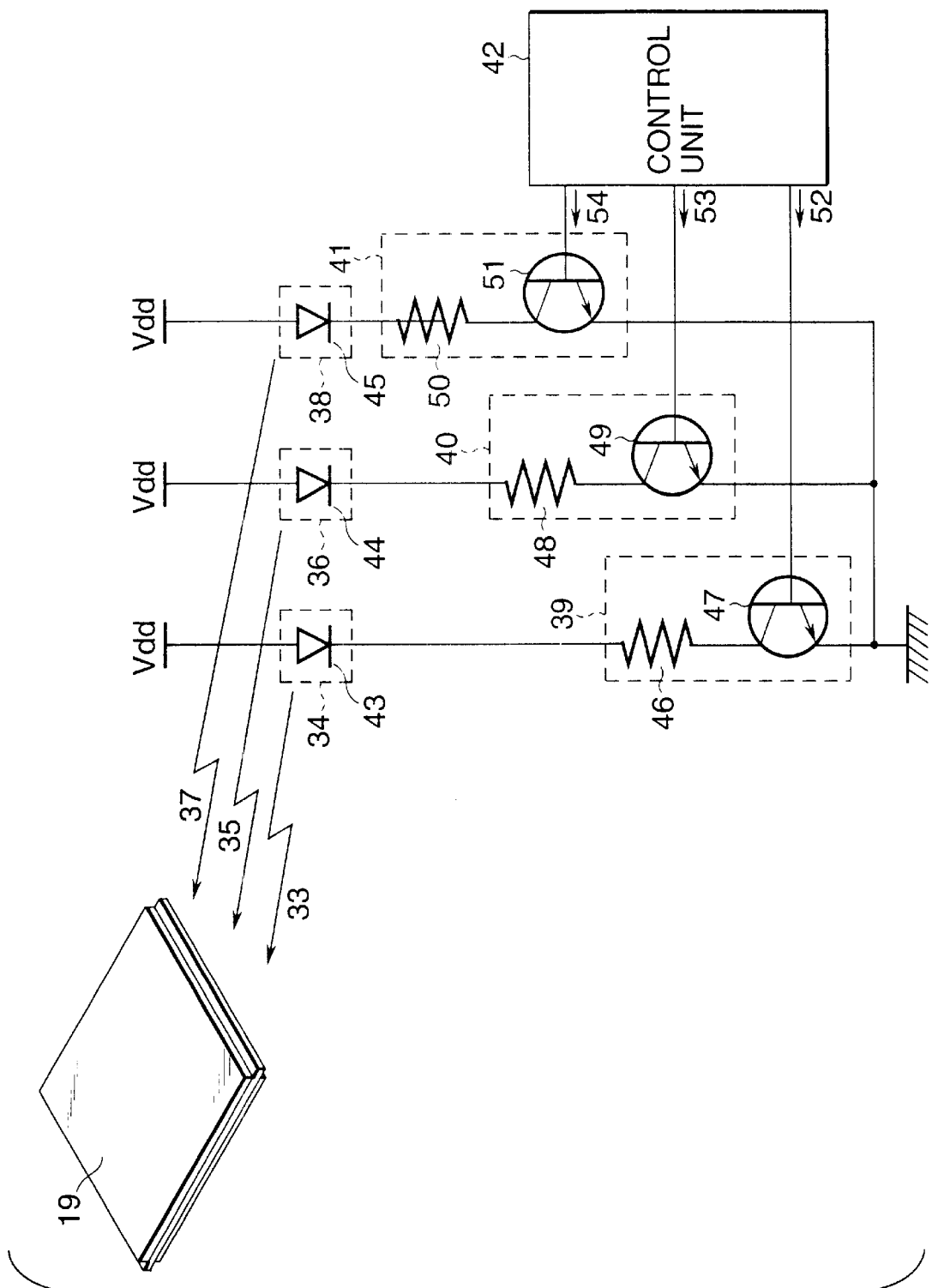
FIG. 12 shows the configuration of a circuit for lighting the liquid crystal display of the mobile telephone equivalent to the embodiment of the invention.

Next, a circuit will be described. FIG. 12 shows the configuration of a circuit for lighting the crystal display assembly 6 of the mobile telephone in the embodiment of the invention. As shown in FIG. 11, the circuit for lighting the liquid crystal display assembly 6 is provided with the liquid-crystal display 19 for displaying a character, a digit, a mark and others, first light emitting means 34 for outputting radiated light 33 having a first wavelength as the lighting means of the liquid-crystal display 19, second light emitting means 36 for outputting radiated light 35 having a second wavelength as the lighting means of the liquid-crystal display 19, third light emitting means 38 for outputting radiated light 37 having a third wavelength as the lighting means of the liquid-crystal display 19, first driving means 39 for driving the first light emitting means 34, second driving means 40 for driving the second light emitting means 36, third driving means 41 for driving the third light emitting means 38 and control means 42 for controlling the first driving means 39, the second driving means 40 and the third driving means 41.

Also, the first light emitting means 34 is composed of a first luminous element 43 for emitting light having the first wavelength 33, the second light emitting means 36 is composed of a second luminous element 44 for emitting light having the second wavelength 35 and the third light emitting means 41 is composed of a third luminous element 45 for emitting light having the third wavelength 37. The first driving means 39 is composed of a first resistor 46 for limiting the current of the first luminous element 43 and a first transistor 47 for applying driving voltage or stopping the supply of driving voltage, the second driving means 40 is composed of a second resistor 48 for limiting the current of the second luminous element 44 and a second transistor 49 for applying driving voltage or stopping the supply of driving voltage, and the third driving means 41 is composed of a third resistor 50 for limiting the current of the third luminous element 45 and a third transistor 51 for applying driving voltage or stopping the supply of driving voltage.

A first control signal 52 for controlling the first transistor 47 is issued from the control means 42, a second control signal 53 for controlling the second transistor 49 is issued from the control means 42 and a third control signal 54 for controlling the third transistor 51 is issued from the control means 42.

Next, the operation of the circuit will be described. The control means 42 activates a first control signal 52 when the mobile telephone is in a first working condition. As a result, the transistor 47 of the first driving means is turned on, voltage is applied to the first luminous element 43, the first luminous element 43 emits light having the first wavelength 33, light of color having the first wavelength is conducted to the light conductor and the liquid-crystal display 19 is lighted from the back.

Also, the control means 42 activates a second control signal 53 when the mobile telephone is in a second working condition. As a result, the transistor 49 of the second driving means is turned on, voltage is applied to the second luminous element 44, the second luminous element 44 emits light having the second wavelength 35, light of color having the second wavelength is conducted to the light conductor and the liquid-crystal display 19 is lighted from the back.

Further, the control means 42 activates a third control signal 54 when the mobile telephone is in a third working condition. As a result, the transistor 51 of the third driving means is turned on, voltage is applied to the third luminous element 45, the third luminous element 45 emits light having the third wavelength 37, light of color having the third wavelength is conducted to the light conductor and the liquid-crystal display 19 is lighted from the back.

Also, the control means 42 activates a first control signal 52 and a second control signal 53 when the mobile telephone is in a fourth working condition. As a result, the transistors 47 and 49 of the first and second driving means are turned on, voltage is applied to the first and second luminous elements 43 and 44, the first and second luminous elements 43 and 44 respectively emit light having the first wavelength 33 and light having the second wavelength 35, light of colors having first and second wavelengths is conducted to the light conductor and the liquid-crystal display 19 is lighted from the back.

Also, the control means 42 activates a first control signal 52 and a third control signal 54 when the mobile telephone is in a fifth working condition. As a result, the transistors 47 and 51 of the first and third driving means are turned on, voltage is applied to the first and third luminous elements 43 and 45, the first and third luminous elements 43 and 45 respectively emit light having the first wavelength 33 and light having the third wavelength 37, light of colors having the first and third wavelengths is conducted to the light conductor and the liquid-crystal display 19 is lighted from the back.

Also, the control means activates a second control signal 53 and a third control signal 54 when the mobile telephone is in a sixth working condition. As a result, the transistors 49 and 51 of the second and third driving means are turned on, voltage is applied to the second and third luminous elements 44 and 45, the second and third luminous elements 44 and 45 respectively emit light having the second wavelength 35 and light having the third wavelength 37, light of colors having the second and third wavelengths is conducted to the light conductor and the liquid-crystal display 19 is lighted from the back.

Also, the control means 42 activates first, second and third control signals 52, 53 and 54 when the mobile telephone is in a seventh working condition. As a result, the transistors 47, 49 and 51 of the first, second and third driving means are turned on, voltage is applied to the first, second and third luminous elements 43, 44 and 45, the first, second and third luminous elements 43, 44 and 45 respectively emit light having the first, second and third wavelengths 33, 35 and 37, light of colors having the first, second and third wavelengths is conducted to the light conductor and the liquid-crystal display 19 is lighted from the back.

As described above, as the mobile telephone can be in a any working condition of the first to the seventh working conditions, the liquid crystal display can be lighted with light of total seven types of colors, that is, three types of colors having the same wavelengths as luminescent colors and four types of resultant colors.

As described above, in the embodiment of the invention, as the points where respective light is synthesized of luminous elements R, G and B can be all equalized in case the bodies of luminous elements are arranged rectilinearly along one side of the liquid-crystal display, no unevenness in brightness and no irregular color are caused in a range of display of the display and displayed character and mark can be plainly read.

As described above, in case the body of luminous elements is arranged in parallel in the direction of the liquid-crystal display, the optical path of lower B is longer than that of upper R, however, as points where beams of light are synthesized formed by adjacent bodies of luminous elements can be equalized, no unevenness in brightness and no irregular color are caused in a range of display of the display and displayed character, mark and others can be plainly read. Also, to equalize the luminance of lower B and that of upper R, current flowing in the luminous element has only to be regulated.

Further, in case current flowing in each luminous element is controlled to enable regulating and varying the luminous energy of each luminous element, the intensity of radiated light can be varied. In this case, it is desirable that the magnitude of the resistor connected to the body of luminous elements in series is varied and as irregular color among luminous elements and unevenness in density in a visible range can be avoided even if the magnitude of the resistor is varied as described above, the liquid-crystal display can display plain character and mark and others and a user can see plain character, mark and others.

In the embodiment of the invention, the example using the body of luminous elements in which the first, second and third luminous elements are integrated is described above, however, the first, second and third luminous elements is not necessarily required to be integrated. In this case, the first, second and third luminous elements are collectively arranged to be a group of luminous elements and plural groups of luminous elements have only to be provided at a short interval in the same direction along one side of the liquid-crystal display or have only to be arranged in parallel at a short interval in the direction of the liquid-crystal display.

In this case, a body of luminous elements may be advantageous. First, devices on the printed board are mounted on the surface by a mounting apparatus, however, in that case, the size and power of the mounting apparatus are determined based upon the number of devices. For example, in case 100 types of electronic devices are mounted on one side of the printed board, it is desirable that two pieces of mounting apparatus each of which can mount 50 types are prepared or one mounting apparatus which can mount 100 types is prepared. In the case of a body of luminous elements, as the type of devices is smaller by two, compared with the case of a group of luminous elements, the type of devices can be reduced by two, however, as the type of devices is conversely more by two in the case of a group of luminous elements, there is a problem having a great effect upon facilities that sometimes three pieces of mounting apparatus each of which can mount 50 types are required to be prepared or two pieces of mounting apparatus each of which can mount 100 types are required to be prepared. The smaller in the type of devices is desirable. Therefore, as the number of devices is smaller in a body of luminous elements than in a group of luminous elements, constraint upon mounting apparatus and facilities can be reduced and is suitable for reflow mounting.

A device of this type is supplied on a reel and when a reel is unloaded, it is replaced with an unused reel and mounting is continued, however, as in the case of a body of luminous elements, one reel has only to be replaced, while in the case of a group of luminous elements, three reels are required to be replaced, work time for replacement can be reduced up to ⅓ and mounting efficiency can be enhanced.

Further, in this embodiment, the case that three bodies of luminous elements are provided is described above, however, even if two or four bodies of luminous elements are provided, the situation is similar.

Also, in this embodiment, as the problem of unevenness in brightness and irregular color can be solved without increasing consumed current and simultaneously, the liquid crystal display can be lighted with light of multiple types of colors, operating time since a battery is fully charged until the battery becomes empty is not reduced in case the illumination apparatus according to the invention is used for equipment to which power is supplied by a battery of limited capacity such as mobile information equipment, continuous operating time is extended and the illumination apparatus according to the invention is suitable for this type of equipment.

Figure 13:
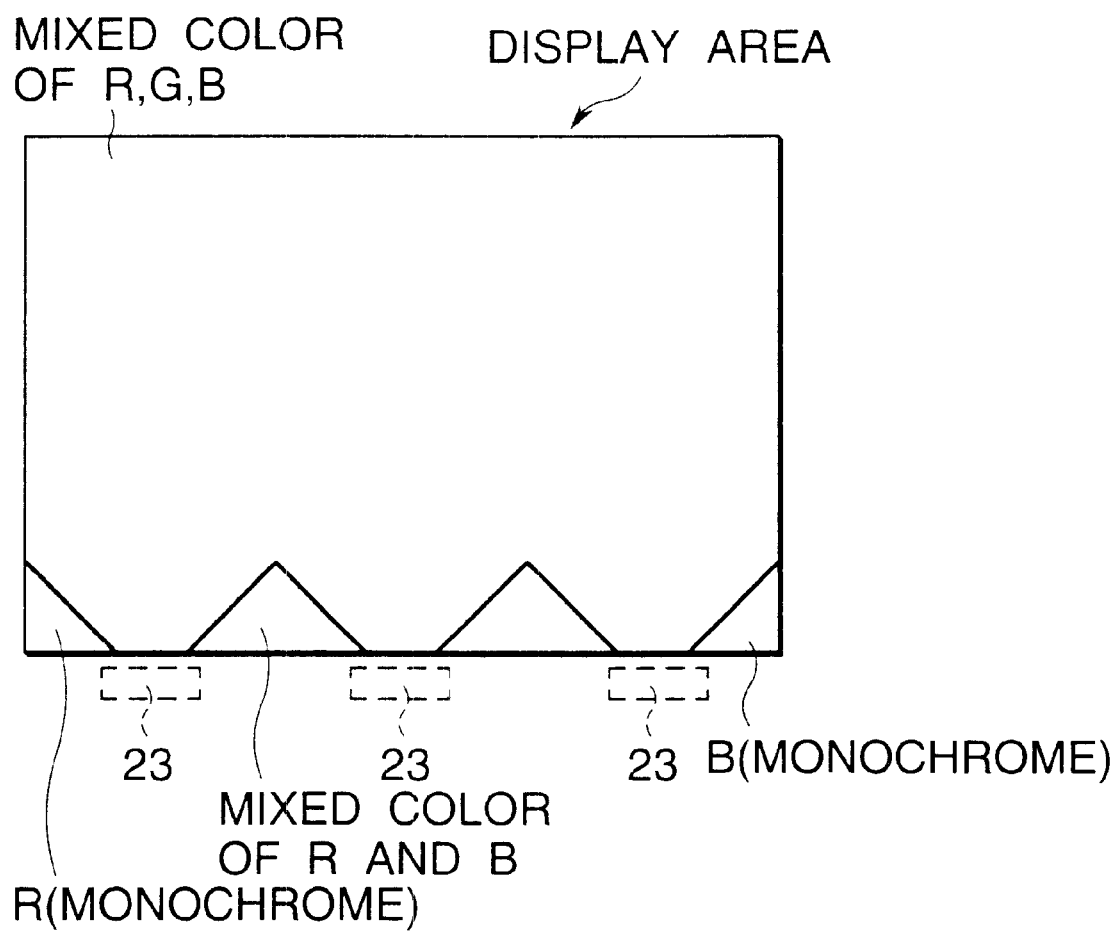
FIG. 13 shows a state of lighting when a range of display is lighted with composite color.

FIG. 13 shows a state of lighting when a range of display is lighted in composite color. As shown in FIG. 13, when three bodies of luminous elements are all lighted, the whole region is in color acquired by mixing R, G and B in this embodiment, however, as the range is lighted with light having a wavelength of R, light having wavelengths of B and R and light having a wavelength of R from the left end in a lower part in case this embodiment is not applied, the display is required to be shifted upward and the equipment is large-sized.

An interval between bodies of luminous elements is determined at the stage of design when a range to be lighted and brightness are determined, in this embodiment, an interval between respective two of three bodies of luminous elements is equalized and brightness in a range of display is regulated by the angle of tilted surface and the roughness of it. That is, as according to the invention, distance between a point where beams of light are synthesized and the body of luminous elements can be minimized by the light diffusing means whether monochrome or composite color, irregular color can be solved. In case distance between the point described above and the body of luminous elements is long, right and left parts or upper and lower parts in a range of display cannot be uniformly lighted.

Further, in the embodiment of the invention, three bodies of luminous elements are provided, however, as the light diffusing means is provided to diffuse light radiated from the luminous element at the shortest distance and in a wide range, the number of bodies of luminous elements is not limited.

That is, in case at least one body of luminous elements is provided, light radiated from the luminous element is diffused at the shortest distance and in a wide range and the body includes plural luminous elements, distance between a point where colors of respective light are mixed together with action described above and the luminous element is minimized.

As described above, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, plural groups of luminous elements (plural bodies of luminous elements) are arranged at an interval in the same direction along one side of the liquid-crystal display, light incident from the incident part of the light conducting means is conducted, reflecting on a reflecting surface and an incidence plane, the whole liquid-crystal display is lighted, hereby, effect that a point where beams of light are synthesized can be formed in an extremely close position to the luminous element by making light emitted from the luminous element incident on the incident part of the light conducting means and reflecting the incident light on the reflecting surface and the incidence plane of the light conducting means without arranging multiple luminous elements in the liquid-crystal display, the irregular color of lighting light and the unevenness of brightness are solved and a character, a mark and others displayed on the display can be plainly read is produced.

Also, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, further, light diffusing means is provided to the incident part, plural groups of luminous elements (plural bodies of luminous elements) are arranged at an interval in the same direction along one side of the liquid-crystal display, hereby, effect that a point where light emitted from one luminous element and light emitted from another luminous element are synthesized can be formed in an extremely close position to the luminous elements by light diffusing means provided to the incident part without arranging multiple luminous elements in the liquid-crystal display, the irregular color of lighting light and the unevenness of brightness are solved and a character, a mark and others displayed on the display can be plainly read is produced.

Also, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, further, light diffusing means is provided to the incident part, plural groups of luminous elements (plural bodies of luminous elements) are arranged in parallel at an interval in the direction of the liquid-crystal display, hereby, effect that a point where light emitted from one luminous element and light emitted from another luminous element are synthesized can be formed in an extremely close position to the luminous elements by light diffusing means provided to the incident part without arranging multiple luminous elements in the direction of the liquid-crystal display, the irregular color of lighting light and the unevenness of brightness are solved and a character, a mark and others displayed on the display can be plainly read is produced.

Also, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, light diffusing means is provided to the reflecting surface on which first reflection is performed of the light conducting means, plural groups of luminous elements (plural bodies of luminous elements) are arranged at an interval in the same direction along one side of the liquid-crystal display, hereby, effect that a point where light emitted from one luminous element and light emitted from another luminous element are synthesized can be formed in an extremely close position to the luminous elements by light diffusing means provided to the reflecting surface on which first reflection is performed of the light conducting means without arranging multiple luminous elements in the liquid-crystal display, the irregular color of lighting light and the unevenness of brightness are solved and a character, a mark and others displayed on the display can be plainly read is produced.

Also, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, light diffusing means is provided to the reflecting surface on which first reflection is performed of the light conducting means, plural groups of luminous elements (plural bodies of luminous elements) are arranged in parallel at an interval in the direction of the liquid-crystal display, hereby, effect that a point where light emitted from one luminous element and light emitted from another luminous element are synthesized can be formed in an extremely close position to the luminous elements by light diffusing means provided to the reflecting surface on which first reflection is performed of the light conducting means without arranging multiple luminous elements in the direction of the liquid-crystal display, the irregular color of lighting light and the unevenness of brightness are solved and a character, a mark and others displayed on the display can be plainly read is produced.

Also, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, light diffusing means and light shielding means for preventing light from being transmitted are provided to the reflecting surface on which first reflection is performed of the light conducting means, plural groups of luminous elements (plural bodies of luminous elements) are arranged at an interval in the same direction along one side of the liquid-crystal display, hereby, effect that a point where light emitted from one luminous element and light emitted from another luminous element are synthesized can be formed in an extremely close position to the luminous elements by the light diffusing means provided to the reflecting surface on which first reflection is performed of the light conducting means without arranging multiple luminous elements in the liquid-crystal display, the loss of reflected light can be removed by the shielding means provided to the reflecting surface on which first reflection is performed for preventing light from being transmitted, the irregular color of lighting light and the unevenness of brightness are solved and a character, a mark and others displayed on the display can be plainly read is produced.

Also, according to the invention, a printed board, a group of luminous elements (a body of luminous elements) in which plural luminous elements mounted on the printed board and different in a wavelength are arranged at a short interval, light conducting means for conducting light incident on its incident part from the group of luminous elements (the body of luminous elements) as a light source and an approximately rectangular liquid-crystal display for displaying a character, a mark, a digit and others with them irradiated by the light conducting means are provided, light diffusing means and light shielding means for preventing light from being transmitted are provided to the reflecting surface on which first reflection is performed of the light conducting means, plural groups of luminous elements (plural bodies of luminous elements) are arranged in parallel at an interval in the direction of the liquid-crystal display, hereby, effect that a point where light emitted from one luminous element and light emitted from another luminous element are synthesized can be formed in an extremely close position to the luminous elements by the light diffusing means provided to the reflecting surface on which first reflection is performed of the light conducting means without arranging multiple luminous elements in the direction of the liquid-crystal display, the loss of reflected light can be removed by the shielding means provided to the reflecting surface on which first reflection is performed for preventing light from being transmitted, the irregular color of lighting light and the unevenness of brightness are solved and a character, a mark and others displayed on the display can be plainly read is produced.

Also, according to the invention, luminous elements can simultaneously emit, hereby, effect that even if the liquid-crystal display is lighted with light of more types than the types of luminous elements, displayed character, mark, digit and others can be plainly read and further, the equipment provided with such an illumination apparatus can be prevented from being large-sized is produced.

Also, according to the invention, the intensity of radiated light can be varied by controlling current flowing in plural luminous elements and effect that a range of display can be uniformly lighted with light of more types of colors than the types of luminous elements without causing irregular color and the unevenness of brightness is produced.

Also, the invention is suitable for mobile information equipment provided with the illumination apparatus described in detail above. That is, as effect that time since a battery is fully charged until it becomes empty, that is, operating time is not required to be reduced though the capacity of the battery for supplying power to the equipment is limited is produced, the invention is suitable for this type of equipment.

What is claimed is:

1. An illumination apparatus, comprising:
   a printed board;
   a plurality of luminous elements mounted on said printed board that emit lights of which a wavelength are different from each other;
   light conducting means comprising an incident part, the light conducting means being for conducting light incident at the incident part from the plurality of luminous elements;
   a reflecting surface on which the light conducted from the incident part is first reflected; and
   light diffusing means for diffusing the light conducted from the incident part before the light reaches the reflecting surface; and
   an approximately rectangular liquid-crystal display for displaying one of a character, a mark, a digit and others being irradiated by the light conducting means.

2. A illumination apparatus according to claim 1, wherein said luminous elements can simultaneously emit light.

3. A illumination apparatus according to claim 1, wherein the intensity of lighted light is varied by controlling current flowing in said luminous element.

4. A illumination apparatus as claimed in claim 1, wherein said luminous elements are arranged at a short interval, and light incident from the incident part of said light conducting means is conducted, reflecting on said reflecting surface and an incidence plane and the whole liquid-crystal display is lighted.

5. A illumination apparatus as claimed in claim 4, wherein said plural luminous elements are arranged at an interval in the same direction along one side of the liquid-crystal display.

6. A illumination apparatus as claimed in claim 1, wherein said luminous elements are integrated as a single body, and light incident from the incident part of said light conducting means is conducted, reflecting on said reflecting surface and an incidence plane and the whole liquid-crystal display is lighted.

7. A illumination apparatus as claimed in claim 6, wherein plural luminous elements are arranged at an interval in the same direction along one side of the liquid-crystal display.

8. A illumination apparatus as claimed in claim 1,
   further comprising second light diffusing means provided to said incident part, and
   wherein said plural luminous elements are arranged at a short interval.

9. A illumination apparatus as claimed in claim 8, wherein said plural luminous elements are arranged at an interval in the same direction along one side of said liquid-crystal display.

10. A illumination apparatus as claimed in claim 8, wherein plural luminous elements of said body are arranged in parallel at an interval in the direction of said liquid-crystal display.

11. A illumination apparatus as claimed in claim 1, further comprising:
    second light diffusing means provided to said incident part, and
    wherein said luminous elements are integrated as a single body.

12. A illumination apparatus as claimed in claim 11, wherein said plural luminous elements are arranged at an interval in the same direction along one side of said liquid-crystal display.

13. A illumination apparatus as claimed in claim 11, wherein plural luminous elements of said body are arranged in parallel at an interval in the direction of said liquid-crystal display.

14. A illumination apparatus as claimed in claim 1, wherein said light conducting means repeats reflection on plural reflecting surfaces.

15. A illumination apparatus as claimed in claim 14, wherein said plural luminous elements are arranged at an interval in the same direction along one side of said liquid-crystal display.

16. A illumination apparatus as claimed in claim 14, wherein said plural luminous elements are arranged at a short interval.

17. A illumination apparatus as claimed in claim 16, wherein said plural luminous elements are arranged at an interval in the same direction along one side of said liquid-crystal display.

18. A illumination apparatus as claimed in claim 16, wherein plural luminous elements are arranged in parallel at an interval in the direction of said liquid-crystal display.

19. A illumination apparatus as claimed in claim 14, wherein said plural luminous elements are integrated as a single body.

20. A illumination apparatus as claimed in claim 19, wherein said plural luminous elements are arranged at an interval in the same direction along one side of said liquid-crystal display.

21. A illumination apparatus as claimed in claim 19, wherein plural luminous elements are arranged in parallel at an interval in the direction of said liquid-crystal display.

22. A illumination apparatus as claimed in claim 14, further comprising:
    shielding means for preventing light from being transmitted to the reflecting surface.

23. A illumination apparatus as claimed in claim 22, wherein said plural luminous elements are arranged at an interval in the same direction along one side of said liquid-crystal display.

24. A illumination apparatus as claimed in claim 22, wherein said plural luminous elements are arranged at a short interval.

25. A illumination apparatus as claimed in claim 24, wherein said plural luminous elements are arranged at an interval in the same direction along one side of said liquid-crystal display.

26. A illumination apparatus as claimed in claim 24, wherein plural luminous elements are arranged in parallel at an interval in the direction of said liquid-crystal display.

27. A illumination apparatus as claimed in claim 22, wherein said plural luminous elements are integrated as a single body.

28. A illumination apparatus as claimed in claim 20, wherein plural luminous elements are arranged at an interval in the same direction along one side of said liquid-crystal display.

29. A illumination apparatus as claimed in claim 20, wherein plural luminous elements are arranged in parallel at an interval in the direction of said liquid-crystal display.

30. Mobile information equipment, comprising:

an illumination apparatus comprising: a printed board;

a plurality of luminous elements mounted on said printed board that emit lights of which a wavelength are different from each other;

light conducting means comprising an incident part, the light conducting means being for conducting light incident at the incident part from the plurality of luminous elements;

a reflecting surface on which the light conducted from the incident part is first reflected; and light diffusing means for diffusing the light conducted from the incident part before the light reaches the reflecting surface; and an approximately rectangular liquid-crystal display for displaying one of a character, a mark, a digit and others being irradiated by the light conducting means.

* * * * *

UNITED STATES PATENT AND TRADEMARK OFFICE
CERTIFICATE OF CORRECTION

PATENT NO. : 6,523,966 B1 Page 1 of 1
DATED : February 25, 2003
INVENTOR(S) : Noriyoshi Satoh et al.

It is certified that error appears in the above-identified patent and that said Letters Patent is hereby corrected as shown below:

Column 6,
Line 1, please delete "reflection-on", and insert therefor -- reflection on --.

Column 15,
Line 10, please delete "holding-member", and insert therefor -- holding member --.
Line 51, after "angle", please insert therefor -- ψ --.

Column 27,
Line 4, please delete "claim 20", and insert therefor -- claim 27 --.
Line 8, please delete "claim 20", and insert therefor -- claim 27 --.

Signed and Sealed this

Twentieth Day of January, 2004

JON W. DUDAS
*Acting Director of the United States Patent and Trademark Office*